(12) United States Patent
Tang et al.

(10) Patent No.: US 8,160,513 B2
(45) Date of Patent: Apr. 17, 2012

(54) METHODS AND APPARATUS FOR IMPLEMENTING PHASE ROTATION AT BASEBAND FREQUENCY FOR TRANSMIT DIVERSITY

(75) Inventors: Yiwu Tang, San Diego, CA (US);
Mahim Ranjan, La Jolla, CA (US);
Marco Cassia, San Diego, CA (US);
Christian Holenstein, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 929 days.

(21) Appl. No.: 12/185,041

(22) Filed: Aug. 1, 2008

(65) Prior Publication Data

US 2010/0029223 A1    Feb. 4, 2010

(51) Int. Cl.
*H04B 7/02* (2006.01)
*H04B 1/02* (2006.01)

(52) U.S. Cl. ............... 455/101; 455/91; 455/103

(58) Field of Classification Search ............ 455/91, 455/101, 125, 102, 103, 67.11; 375/267, 375/295, 299, 146
See application file for complete search history.

(56) References Cited

U.S. PATENT DOCUMENTS

| | | | | |
|---|---|---|---|---|
| 5,542,107 A * | 7/1996 | Kay | ............... | 455/513 |
| 6,539,209 B1 * | 3/2003 | Dajer et al. | ............... | 455/101 |
| 7,103,326 B2 * | 9/2006 | Wu et al. | ............... | 455/101 |
| 7,460,581 B2 * | 12/2008 | Serratore et al. | ............... | 375/146 |
| 7,483,675 B2 * | 1/2009 | Kent et al. | ............... | 455/67.11 |
| 7,505,527 B2 * | 3/2009 | Hwang et al. | ............... | 375/267 |
| 7,586,979 B2 * | 9/2009 | Serratore et al. | ............... | 375/146 |
| 7,881,673 B2 * | 2/2011 | Kent et al. | ............... | 455/67.11 |
| 2006/0120473 A1 | 6/2006 | Baum | | |
| 2006/0184862 A1 | 8/2006 | Kim et al. | | |

FOREIGN PATENT DOCUMENTS

EP    1775872    4/2007

OTHER PUBLICATIONS

S. Gueorguiev, et al, "A 5.2GHz CMOS I/Q modulator with integrated phase shifter for beamforming," IEEE J. Solid-State Circuits, vol. 42, No. 9, pp. 1953-1962, Sep. 2007.
A. Natarajan, et al, "A fully integrated 24-GHz phased-array transmitter in CMOS," IEEE J. Solid-State Circuits, vol. 40, No. 12, pp. 2502-2514, Dec. 2005.
D.G. Rahn, et al, "A fully integrated multiband MIMO WLAN transceiver RFIC," IEEE J. Solid-State Circuits, vol. 40, No. 8, pp. 1629-1641, Aug. 2005.

(Continued)

*Primary Examiner* — Sonny Trinh
(74) *Attorney, Agent, or Firm* — Eric Ho

(57) ABSTRACT

An apparatus for implementing phase rotation at baseband frequency for transmit diversity may include a primary transmit signal path and a diversity transmit signal path. Both the primary transmit signal path and the diversity transmit signal path may receive a primary transmit signal. A signal selector within the diversity transmit signal path may perform phase rotation with respect to the primary transmit signal while the primary transmit signal is at a baseband frequency, thereby producing a diversity transmit signal.

41 Claims, 7 Drawing Sheets

OTHER PUBLICATIONS

A. Natarajan, et al, "A 77GHz phased-array transmitter with local LO-path phase-shifting in silicon," IEEE ISSCC, pp. 639-648, 2006.

Burr A G, "Adaptive space-time signal processing and coding," vol. 2, pp. 710-714 MILCOM 2000. 21st Century Military Communications Conference Proceedings Oct. 22-25, 2000, 20001022; 20001022-20001025 Piscataway, NJ, USA,IEEE—ISBN 978-0-7803-6521-6 ; ISBN 0-7803-6521-6; XP010531996.

International Search Report and Written Opinion—PCT/US2009/052578, International Search Authority—European Patent Office—Sep. 23, 2010.

Zhefeng et al., "PAPR Reduction for Repetition Space-Time-Frequency Coded MIMO-OFDM Systems Using Chu Sequences, Piscataway, NU, US LNKDDOI: 10.1109/TWC.2008.061024, XP011226311 ISSN: 1536-1276 p. 1195, col. 1-col. 2, paragraph 1 Sections IV, V,".

* cited by examiner

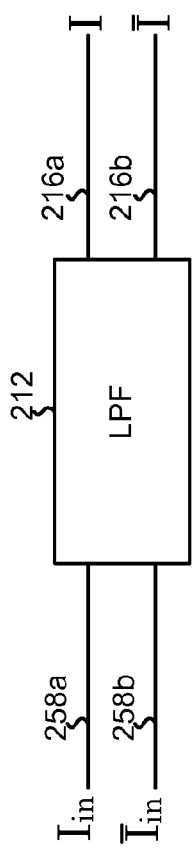
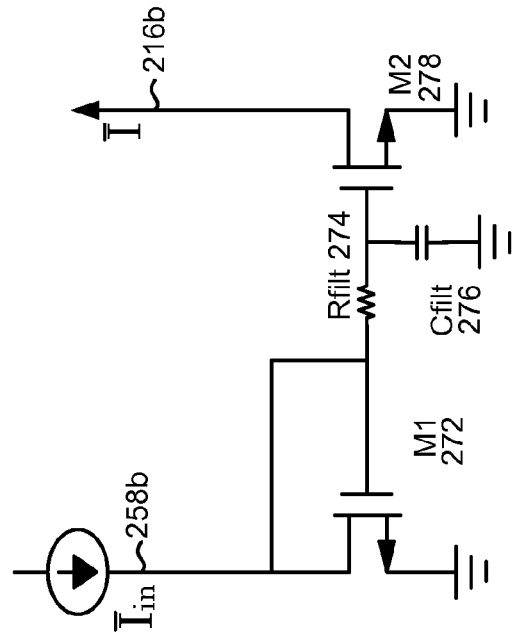
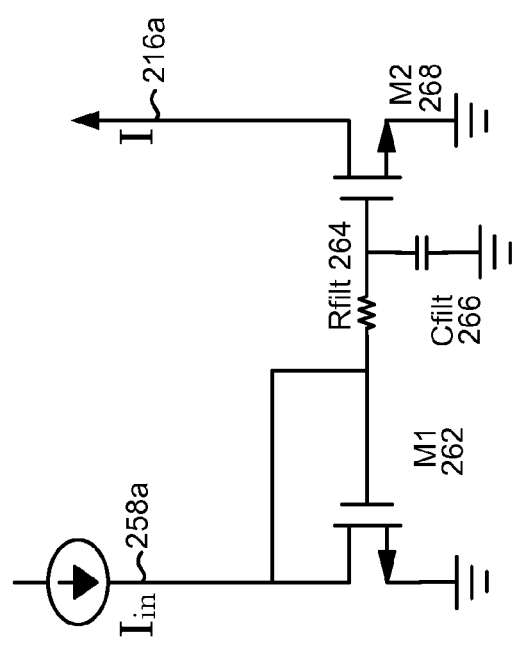

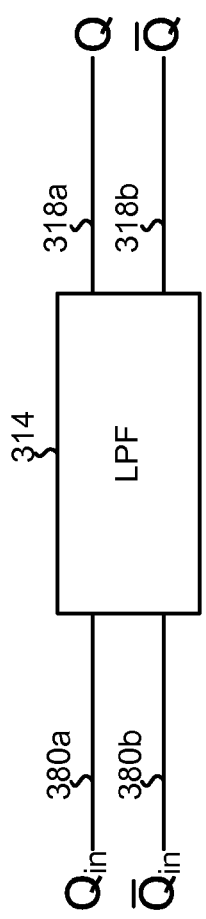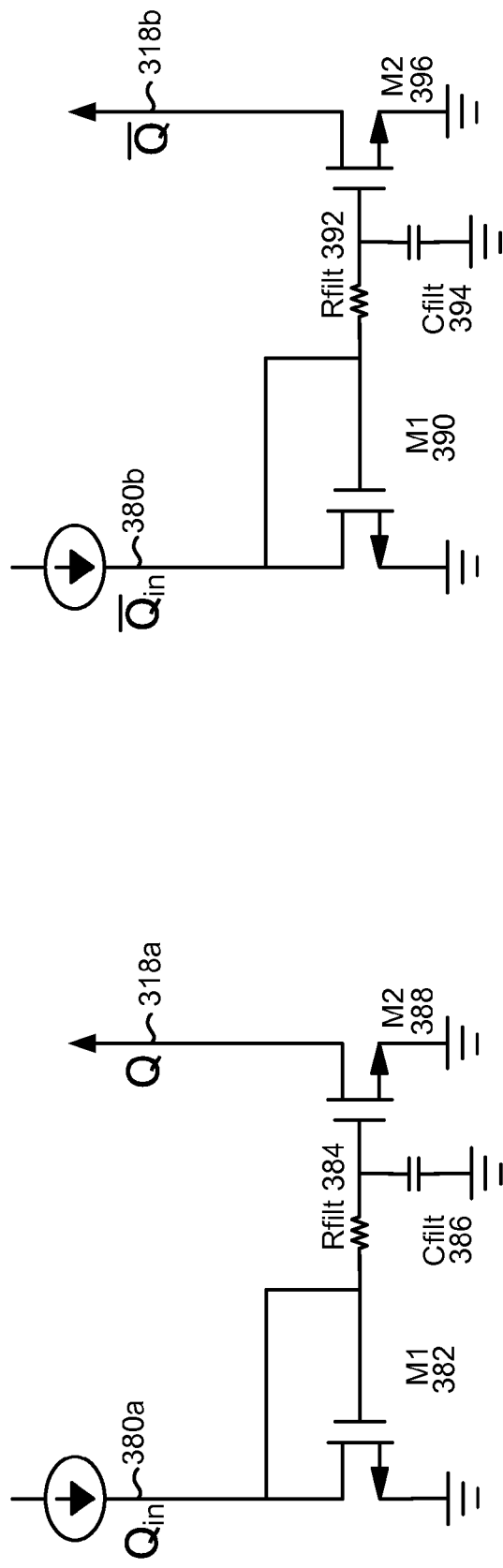

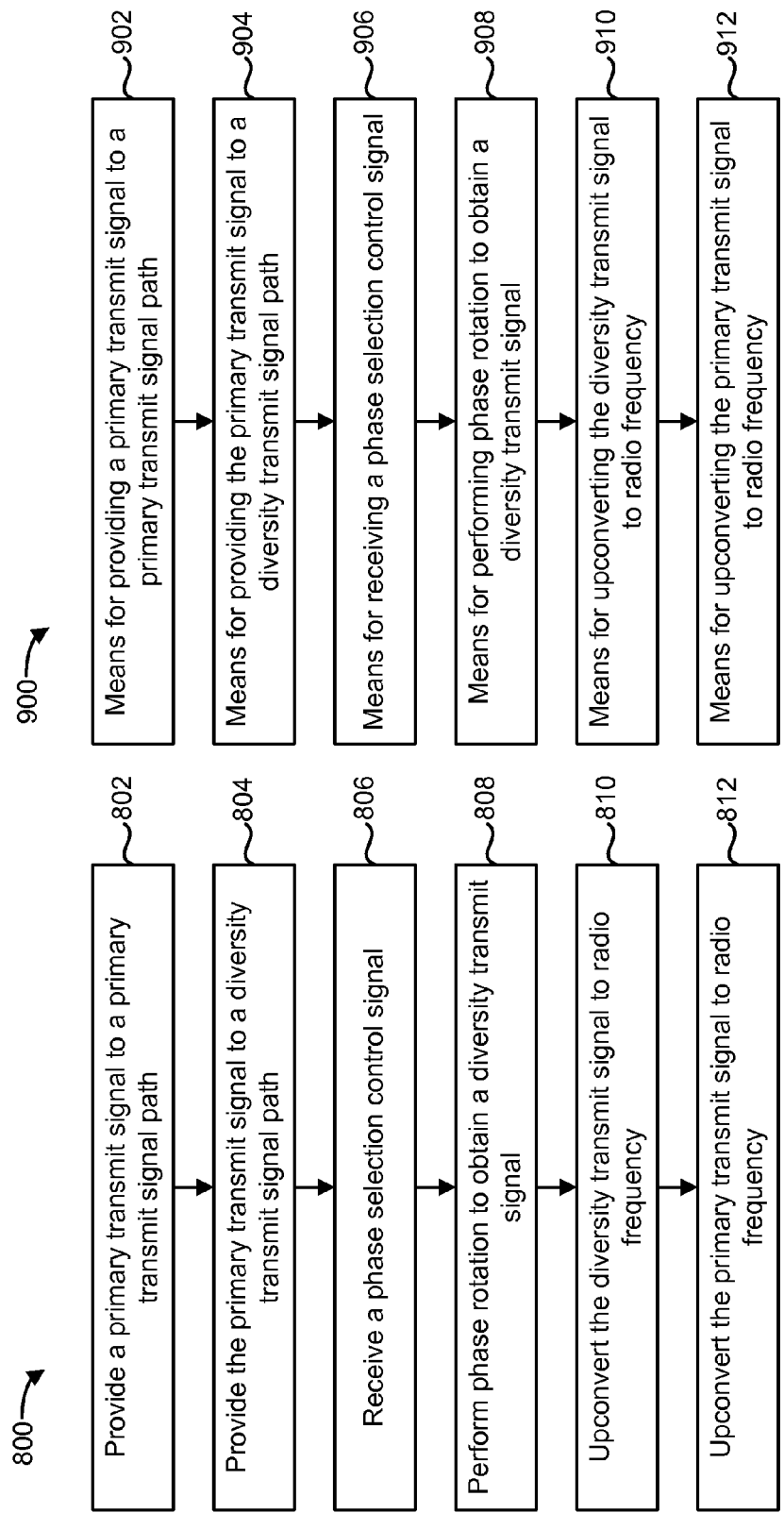

METHODS AND APPARATUS FOR IMPLEMENTING PHASE ROTATION AT BASEBAND FREQUENCY FOR TRANSMIT DIVERSITY

TECHNICAL FIELD

The present disclosure relates to wireless communication systems. More specifically, the present disclosure relates to methods and apparatus for implementing phase rotation at baseband frequency for transmit diversity.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, an access terminal, a remote station, a user terminal, a terminal, a subscriber unit, user equipment, etc. The term "mobile station" will be used herein.

A wireless communication system may provide communication for a number of cells, each of which may be serviced by a base station. A base station may be a fixed station that communicates with mobile stations. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station. A wireless communication system may simultaneously support communication for multiple mobile stations.

As used herein, the term "diversity" refers generally to the various methods that are available for providing a receiver with uncorrelated renditions of a signal of interest. There are many ways that diversity methods may be implemented. For example, in some wireless communication systems, the signal of interest may be redundantly transmitted over two (or possibly more) antennas to provide transmit diversity. Due to multipath and other phenomena, the transmitted signals may experience different path conditions and may arrive at the receiver at different times.

BRIEF DESCRIPTION OF THE DRAWINGS

FIGS. 2A through 2C illustrate an example of a low-pass filter that may be used in the apparatus shown in FIG. 1;

FIGS. 3A through 3C illustrate another example of a low-pass filter that may be used in the apparatus shown in FIG. 1;

FIG. 8 illustrates a method for implementing phase rotation at baseband frequency for transmit diversity; and FIG. 9 illustrates means-plus-function blocks corresponding to the method of FIG. 8.

DETAILED DESCRIPTION

Figure 1:
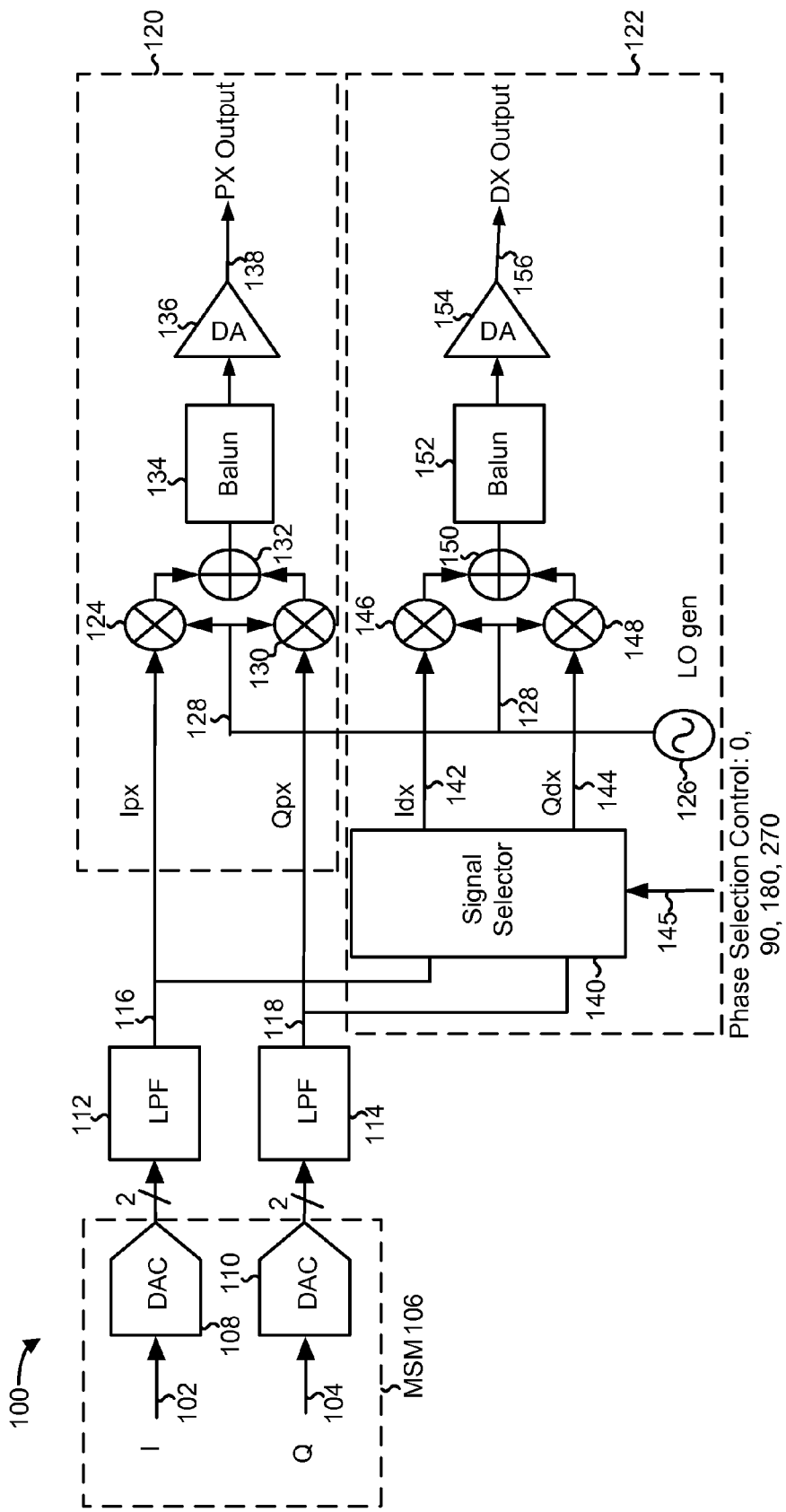
FIG. 1 illustrates an apparatus for implementing phase rotation at baseband frequency for transmit diversity.

The techniques described herein may be utilized in a mobile station to provide mobile transmit diversity (MTD). Mobile transmit diversity may provide additional capacity and coverage, particularly at the edge of a cell within a wireless communication system. The techniques described herein may also be used in a base station to provide transmit diversity with respect to downlink transmissions.

Transmit diversity involves the use of (at least) two transmit signal paths. These transmit signal paths may be referred to herein as a primary transmit signal path and a diversity transmit signal path. The signal that is produced by the primary transmit signal path may be referred to herein as a primary transmit signal. The signal that is produced by the diversity transmit signal path may be referred to herein as a diversity transmit signal.

There is a controlled phase difference between the primary transmit signal and the diversity transmit signal. This phase difference may be achieved by rotating the phase of the diversity transmit signal by some predetermined amount (e.g., 0°, 90°, 180°, 270°) relative to the primary transmit signal. The present disclosure relates to techniques for rotating the phase of the diversity transmit signal to achieve the desired phase difference.

In accordance with the present disclosure, an apparatus for implementing phase rotation at baseband frequency for transmit diversity may include a primary transmit signal path and a diversity transmit signal path. Both the primary transmit signal path and the diversity transmit signal path may receive a primary transmit signal. A signal selector within the diversity transmit signal path may perform phase rotation with respect to the primary transmit signal while the primary transmit signal is at a baseband frequency, thereby producing a diversity transmit signal.

A method for implementing phase rotation at baseband frequency for transmit diversity may include providing a primary transmit signal to a primary transmit signal path and providing the primary transmit signal to a diversity transmit signal path. Phase rotation may be performed with respect to the primary transmit signal while the primary transmit signal is at a baseband frequency, thereby obtaining a diversity transmit signal.

An apparatus for implementing phase rotation at baseband frequency for transmit diversity may include means for providing a primary transmit signal to a primary transmit signal path. The apparatus may also include means for providing the primary transmit signal to a diversity transmit signal path. The apparatus may also include means for performing phase rotation with respect to the primary transmit signal while the primary transmit signal is at a baseband frequency, thereby obtaining a diversity transmit signal.

A computer-program product for implementing phase rotation at baseband frequency for transmit diversity may include a computer readable medium having instructions thereon. The instructions may include code for providing a primary transmit signal to a primary transmit signal path. The instructions may also include code for providing the primary transmit signal to a diversity transmit signal path. The instructions may also include code for performing phase rotation with respect to the primary transmit signal while the primary transmit signal is at a baseband frequency, thereby obtaining a diversity transmit signal.

FIG. 1 illustrates an apparatus 100 for implementing phase rotation at baseband frequency for transmit diversity. The apparatus 100 may be, for example, an integrated circuit that may be utilized by a mobile station to provide transmit diversity. However, the applicability of the present disclosure is not limited to mobile stations; the methods described herein may be implemented in base stations as well.

A signal to be transmitted is shown with in-phase 102 and quadrature 104 components. In FIG. 1, the signal 102, 104 to be transmitted is shown originating from a mobile station modem (MSM) 106. However, the signal 102, 104 may originate from any suitable data source.

The signal 102, 104 may be converted from the digital domain to the analog domain by digital-to-analog converters (DACs) 108, 110. Low-pass filtering may then be performed by first and second low-pass filters 112, 114.

The low-pass filters 112, 114 may output a primary transmit signal 116, 118. The primary transmit signal 116, 118 may include both in-phase 116 and quadrature 118 components.

Although this is not explicitly shown in FIG. 1, the in-phase component 116 may include two components, which may be referred to as I and $\bar{I}$, where $\bar{I}$ is 180° out of phase with respect to I. Similarly, the quadrature component 118 may include two components, which may be referred to as Q and $\bar{Q}$, where $\bar{Q}$ is 180° out of phase with respect to Q. This will be described in greater detail below.

The primary transmit signal 116, 118 may be provided to a primary transmit signal path 120. The primary transmit signal 116, 118 may also be provided to a diversity transmit signal path 122.

The primary transmit signal path 120 will be described first. In FIG. 1, the in-phase component 116 of the primary transmit signal is labeled Ipx. The quadrature component 118 of the primary transmit signal is labeled Qpx.

The primary transmit signal 116, 118 may be upconverted to a radio frequency. A multiplier 124 may multiply the in-phase component 116 by a modulation signal 128 that is produced by a local oscillator 126. Similarly, another multiplier 130 may multiply the quadrature component 118 by the same modulation signal 128. An adder 132 may add the outputs of the multipliers 124, 130.

The output of the adder 132 may be provided to a balun 134. The balun 134 may be a transformer that performs differential to single-ended RF signal conversion. The output of the balun 134 may be provided to a single-ended amplifier 136. The final primary transmit signal 138 may be output from the single-ended amplifier 136.

The diversity transmit signal path 122 will now be described. The primary transmit signal 116, 118 may be provided to a signal selector 140 within the diversity transmit signal path 122. The signal selector 140 may perform phase rotation with respect to the primary transmit signal 116, 118, thereby producing a diversity transmit signal 142, 144. The diversity transmit signal 142, 144 includes an in-phase 142 and a quadrature 144 component. The in-phase component 142 is labeled Idx in FIG. 1, and the quadrature component 144 is labeled Qdx in FIG. 1.

The signal selector 140 may perform phase rotation based on a phase selection control signal 145. The phase selection control signal 145 may indicate the desired amount of the phase rotation to be performed by the signal selector 140. For example, the signal selector 140 may be capable of phase rotation at 0°, 90°, 180°, or 270°. The phase selection control signal 145 may have the effect of selecting one of these angles for the phase rotation.

Of course, the signal selector 140 may be capable of implementing phase rotation at angles other than 0°, 90°, 180°, or 270°. This set of possible angles was provided for purposes of illustration only, and should not be interpreted as limiting the scope of the present disclosure.

Thus, there may be a phase difference between the primary transmit signal 116, 118 and the diversity transmit signal 142, 144. This phase difference may be provided by the signal selector 140, which may perform phase rotation with respect to the primary transmit signal 116, 118 to obtain the diversity transmit signal 142, 144. The phase rotation may be performed with respect to the primary transmit signal 116, 118 while it is at a baseband frequency, i.e., before the primary transmit signal 116, 118 is upconverted to a radio frequency for transmission.

The diversity transmit signal 142, 144 may then be upconverted to a radio frequency. A multiplier 146 may multiply the in-phase component 142 by the local oscillation (LO) signal 128 that is produced by the local oscillator 126. Similarly, a multiplier 148 may multiply the quadrature component 144 by the same modulation signal 128. An adder 150 may add the outputs of the multipliers 146, 148.

The output of the adder 150 may be provided to a balun 152. The balun 152 may be a transformer that performs differential to single-ended RF signal conversion. The output of the balun 152 may be provided to a single-ended amplifier 154. The final diversity transmit signal 156 may be output from the single-ended amplifier 154.

FIGS. 2A through 2C illustrate an example of a low-pass filter 212. The low-pass filter 212 may be used as the low-pass filter 112 in the apparatus 100 of FIG. 1. The low-pass filter 212 is just an example of a low-pass filter 212 that may be used, and it should not be interpreted as limiting the scope of the present disclosure.

Referring initially to FIG. 2A, the low-pass filter 212 includes two inputs: $I_{in}$ 258a and $\bar{I}_{in}$ 258b. These inputs $I_{in}$ 258a and $\bar{I}_{in}$ 258b may correspond to the output of the DAC 108 in the apparatus 100 of FIG. 1.

The low-pass filter 212 includes two outputs: I 216a and $\bar{I}$ 216b. These outputs I 216a and $\bar{I}$ 216b may correspond to the in-phase component 116 shown in FIG. 1.

FIG. 2B shows an example of components within the low-pass filter 212 that may be used to perform low-pass filtering with respect to $I_{in}$ 258a to obtain I 216a. These components include a transistor $M_1$ 262, a resistor $R_{filt}$ 264, a capacitor $C_{filt}$ 266, and a transistor $M_2$ 268.

FIG. 2C shows an example of components within the low-pass filter 212 that may be used to perform low-pass filtering with respect to $\bar{I}_{in}$ 258b to obtain $\bar{I}$ 216b. These components include a transistor $M_1$ 272, a resistor $R_{filt}$ 274, a capacitor $C_{filt}$ 276, and a transistor $M_2$ 278.

FIGS. 3A through 3C illustrate an example of a low-pass filter 314. The low-pass filter 314 may be used as the low-pass filter 114 in the apparatus 100 of FIG. 1. The low-pass filter 314 is just an example of a low-pass filter 314 that may be used, and it should not be interpreted as limiting the scope of the present disclosure.

Referring initially to FIG. 3A, the low-pass filter 314 includes two inputs: $Q_{in}$ 380a and $\bar{Q}_{in}$ 380b. These inputs $Q_{in}$ 380a and $\overline{Q}_{in}$ 380b may correspond to the output of the DAC 110 in the apparatus 100 of FIG. 1.

The low-pass filter 314 includes two outputs: Q 318a and $\overline{Q}$ 318b. These outputs Q 318a and $\overline{Q}$ 318b may correspond to the quadrature component 118 shown in FIG. 1.

FIG. 3B shows an example of components within the low-pass filter 314 that may be used to perform low-pass filtering with respect to $Q_{in}$ 380a to obtain Q 318a. These components include a transistor $M_1$ 382, a resistor $R_{filt}$ 384, a capacitor $C_{filt}$ 386, and a transistor $M_2$ 388.

FIG. 3C shows an example of components within the low-pass filter 314 that may be used to perform low-pass filtering with respect to $\overline{Q}_{in}$ 380b to obtain $\overline{Q}$ 318b. These components include a transistor $M_1$ 390, a resistor $R_{filt}$ 392, a capacitor $C_{filt}$ 394, and a transistor $M_2$ 396.

Figure 4:
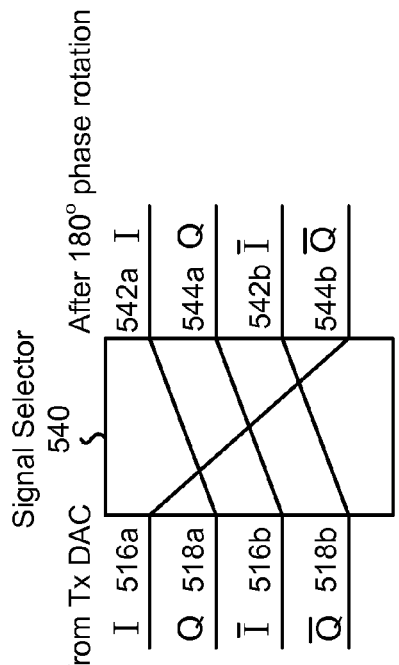
FIG. 4 illustrates an example of a signal selector that may be used in the apparatus shown in FIG. 1, and that may implement a phase rotation of 90°.

FIG. 4 illustrates an example of a signal selector 440 that may implement a phase rotation of 90°. The signal selector 440 shown in FIG. 4 may be used as the signal selector 140 in the apparatus 100 of FIG. 1.

The signal selector 440 has four inputs: I 416a, Q 418a, $\overline{I}$ 416b, and $\overline{Q}$ 418b. I 416a and $\overline{I}$ 416b may correspond to the in-phase component 116 of the primary transmit signal shown in FIG. 1. Q 418a and $\overline{Q}$ 418b may correspond to the quadrature component 118 of the primary transmit signal shown in FIG. 1.

The signal selector 440 has four outputs: I 442a, Q 444a, $\overline{I}$ 442b, and $\overline{Q}$ 444b. I 442a and $\overline{I}$ 442b may correspond to the in-phase component 142 of the diversity transmit signal shown in FIG. 1. 444a and $\overline{Q}$ 444b may correspond to the quadrature component 144 of the diversity transmit signal shown in FIG. 1.

The outputs I 442a Q, 444a, $\overline{I}$ 442b, and $\overline{Q}$ 444b are 90° phase rotated versions of the inputs I 416a, Q 418a, $\overline{I}$ 416b, and $\overline{Q}$ 418b. The 90° phase rotation may be represented by equation (1):

$$I\cos(\omega t+90°)+Q\sin(\omega t+90°)=Q\cos(\omega t)-I\sin(\omega t) \quad (1)$$

To implement this 90° phase rotation, I 416a may be connected to $\overline{Q}$ 444b. Q 418a may be connected to I 442a. $\overline{I}$ 416b may be connected to Q 444a. $\overline{Q}$ 418b may be connected to $\overline{I}$ 442b. These connections are illustrated in FIG. 4.

Figure 5:
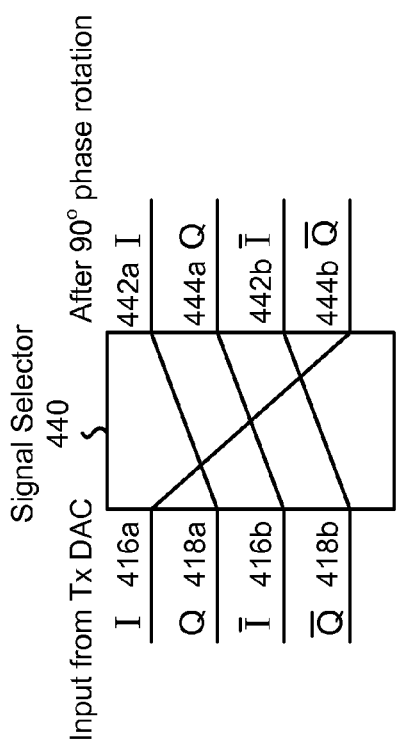
FIG. 5 illustrates an example of a signal selector that may be used in the apparatus shown in FIG. 1, and that may implement a phase rotation of 180°.

FIG. 5 illustrates an example of a signal selector 540 that may implement a phase rotation of 180°. The signal selector 540 shown in FIG. 5 may be used as the signal selector 140 in the apparatus 100 of FIG. 1.

The signal selector 540 has four inputs: I 516a, Q 518a, $\overline{I}$ 516b, and $\overline{Q}$ 518b. I 516a and $\overline{I}$ 516b may correspond to the I signal 116 shown in FIG. 1. Q 518a and $\overline{Q}$ 518b may correspond to the Q signal 118 shown in FIG. 1.

The signal selector 540 has four outputs: I 542a, Q 544a, $\overline{I}$ 542b, and $\overline{Q}$ 544b. I 542a and $\overline{I}$ 542b may correspond to the in-phase component 142 of the diversity transmit signal shown in FIG. 1. Q 544a and $\overline{Q}$ 544b may correspond to the quadrature component 144 of the diversity transmit signal shown in FIG. 1.

The outputs I 542a, Q 544a, $\overline{I}$ 542b, and $\overline{Q}$ 544b are 180° phase rotated versions of the inputs I 516a, Q 518a, $\overline{I}$ 516b, and $\overline{Q}$ 518b. The 180° phase rotation may be represented by equation (2):

$$I\cos(\omega t+180°)+Q\sin(\omega t+180°)=-I\cos(\omega t)-Q\sin(\omega t) \quad (2)$$

To implement this 180° phase rotation, I 516a may be connected to $\overline{I}$ 542b. Q 518a may be connected to $\overline{Q}$ 544b. $\overline{I}$ 516b may be connected to I 542a. $\overline{Q}$ 518b may be connected to Q 544a. These connections are illustrated in FIG. 5.

Figure 6:
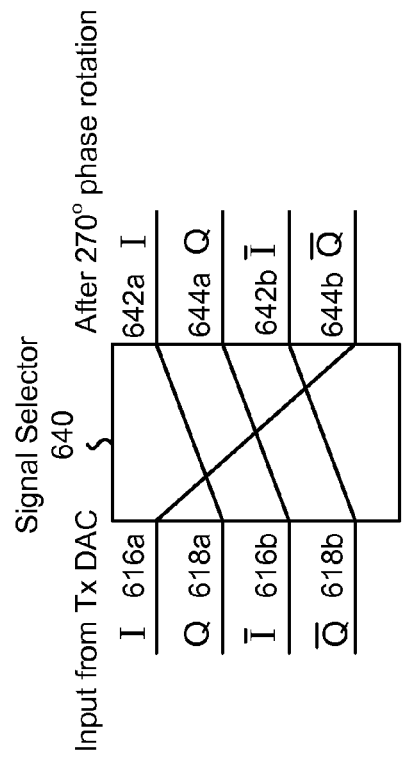
FIG. 6 illustrates an example of a signal selector that may be used in the apparatus shown in FIG. 1, and that may implement a phase rotation of 270°.

FIG. 6 illustrates an example of a signal selector 640 that may implement a phase rotation of 270°. The signal selector 640 shown in FIG. 6 may be used as the signal selector 140 in the apparatus 100 of FIG. 1.

The signal selector 640 has four inputs: I 616a, Q 618a, $\overline{I}$ 616b, and $\overline{Q}$ 618b. I 616a and $\overline{I}$ 616b may correspond to the in-phase component 116 of the primary transmit signal shown in FIG. 1. Q 618a and $\overline{Q}$ 618b may correspond to the quadrature component 118 of the primary transmit signal shown in FIG. 1.

The signal selector 640 has four outputs: I 642a, Q 644a, $\overline{I}$ 642b, and $\overline{Q}$ 644b. I 642a and $\overline{I}$ 642b may correspond to the in-phase component 142 of the diversity transmit signal shown in FIG. 1. Q 644a and $\overline{Q}$ 644b may correspond to the quadrature component 144 of the diversity transmit signal shown in FIG. 1.

The outputs I 642a, Q 644a, $\overline{I}$ 642b, and $\overline{Q}$ 644b are 270° phase rotated versions of the inputs I 616a, Q 618a, $\overline{I}$ 616b, and $\overline{Q}$ 618b. The 270° phase rotation may be represented by equation (3):

$$I\cos(\omega t+270°)+Q\sin(\omega t+270°)=-Q\cos(\omega t)+I\sin(\omega t) \quad (3)$$

To implement this 270° phase rotation, I 616a may be connected to Q 644a. Q 618a may be connected to $\overline{I}$ 642b. $\overline{I}$ 616b may be connected to $\overline{Q}$ 644b. $\overline{Q}$ 618b may be connected to I 642a. These connections are illustrated in FIG. 6.

The signal selectors 440, 540, 640 shown in FIGS. 4-6 implement phase rotations of 90°, 180°, and 270°, respectively. However, these angles of phase rotation were provided for purposes of illustration only, and should not be interpreted as limiting the scope of the present disclosure.

If the phase step is finer than 90° steps, as shown in these examples, a more general form of phase rotation is feasible. This may be represented by equation (4):

$$I\cos(\omega t+45°)+Q\sin(\omega t+45°)= \\ \frac{\sqrt{2}}{2}(I+Q)\cos(\omega t)+\frac{\sqrt{2}}{2}(-I+Q)\sin(\omega t) \quad (4)$$

A similar approach may be applied to other multiples of 45°. A scaling factor may be utilized to normalize the combined current. Both the combining and the scaling can be done with a current mirror.

Finer phase steps can be generated through current combining with proper scaling. The resolution may be limited by the current mirror ratio resolution.

Figure 7:
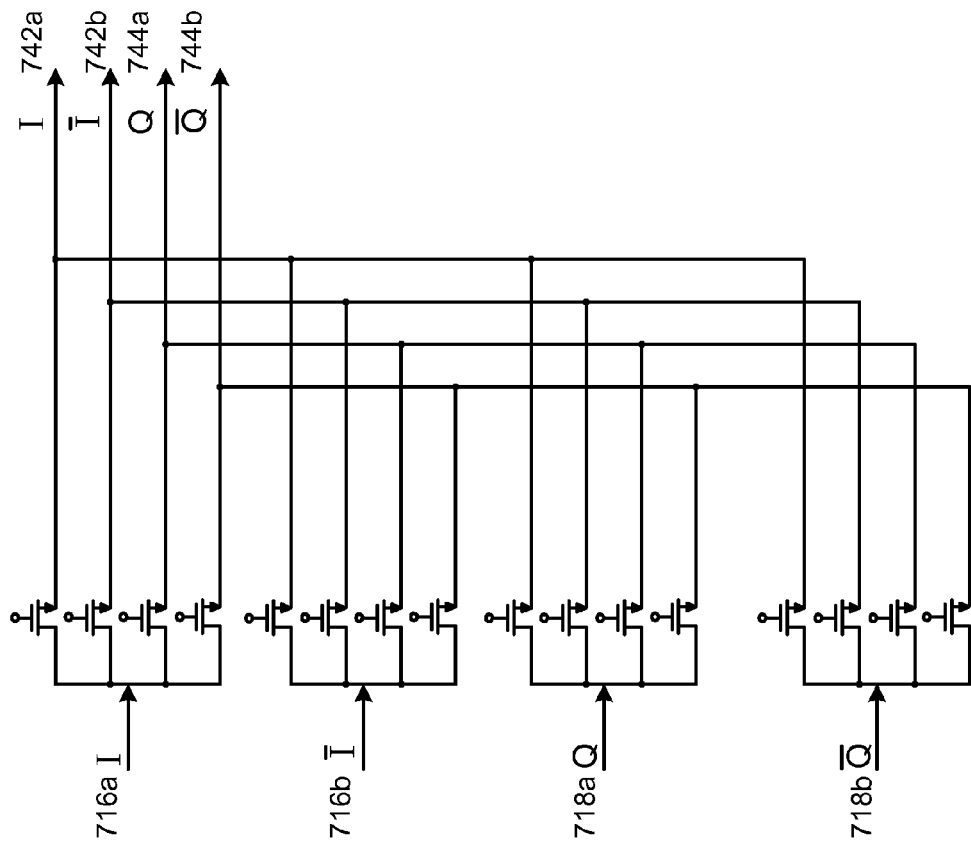
FIG. 7 illustrates an example of a signal selector that is implemented using a crosspoint switch.

FIG. 7 illustrates an example of a signal selector 740 that is implemented using a crosspoint switch. The signal selectors 140, 440, 540, 640 shown in FIGS. 1 and 4-6 may be implemented similarly to the signal selector 740 shown in FIG. 7.

The signal selector 740 has four inputs: I 716a, Q 718a, $\overline{I}$ 716b, and $\overline{Q}$ 718b. I 716a and $\overline{I}$ 716b may correspond to the in-phase component 116 of the primary transmit signal shown in FIG. 1. Q 718a and $\overline{Q}$ 718b may correspond to the quadrature component 118 of the primary transmit signal shown in FIG. 1.

The signal selector 740 has four outputs: I 742a, Q 744a, $\overline{I}$ 742b, and $\overline{Q}$ 744b. I 742a and $\overline{I}$ 742b may correspond to the in-phase component 142 of the diversity transmit signal shown in FIG. 1. Q 744a and $\overline{Q}$ 744b may correspond to the quadrature component 144 of the diversity transmit signal shown in FIG. 1.

The signal selector 740 shown in FIG. 7 is a 4×4 crosspoint switch that connects the inputs I 716a, Q 718a, $\overline{I}$ 716b, and $\overline{Q}$ 718b of the signal selector 740 to the outputs I 742a, Q 744a, Ī 742b, and Q̄ 744b of the signal selector 740 based on a phase selection control signal 145 (not shown in FIG. 7). Each of the inputs I 716a, Q 718a, Ī 716b, and Q̄ 718b is connected to four transistors 798. Thus, in this example, there are sixteen transistors 798 in the signal selector 740. Logic may be provided to control the transistors 798 to make the desired combinations from the inputs I 716a, Q 718a, Ī 716b, and Q̄ 718b to the outputs I 742a, Q 744a, Ī 742b, and Q̄ 744b.

FIG. 8 illustrates a method 800 for implementing phase rotation at baseband frequency for transmit diversity. The method 800 may be implemented by the apparatus 100 shown in FIG. 1.

In accordance with the method 800, a primary transmit signal 116, 118 (which may include both an in-phase component 116 and a quadrature component 118) may be provided 802 to a primary transmit signal path 120. The primary transmit signal 116, 118 may also be provided 804 to a diversity transmit signal path 122.

Within the diversity transmit signal path 122, a phase selection control signal 145 may be received 806. The phase selection control signal 145 may indicate a desired phase difference between the primary transmit signal 116, 118 and a diversity transmit signal 142, 144. Phase rotation may then be performed 808 with respect to the primary transmit signal 116, 118, thereby producing the diversity transmit signal 142, 144. Phase rotation may be performed 808 based on the angle that is specified by the phase selection control signal 145. Phase rotation may be performed 808 while the primary transmit signal 116, 118 is at a baseband frequency.

After phase rotation is performed 808, then the diversity transmit signal 142, 144 may be upconverted 810 to a radio frequency. In addition, the primary transmit signal 116, 118 may also be upconverted 812 to a radio frequency.

The method 800 of FIG. 8 described above may be performed by various hardware and/or software component(s) and/or module(s) corresponding to the means-plus-function blocks 900 illustrated in FIG. 9. In other words, blocks 800 through 812 illustrated in FIG. 8 correspond to means-plus-function blocks 900 through 912 illustrated in FIG. 9.

The present disclosure has described methods and apparatus for performing phase rotation for transmit diversity. In accordance with the present disclosure, phase rotation may be performed at baseband frequency. This may provide several advantages compared to other known approaches for phase rotation.

For example, one alternative to the methods and apparatus of the present disclosure involves performing phase rotation at radio frequency (RF). However, if phase rotation is performed at RF, the phase rotation may degrade the signal path performance, due to noise. Also, the phase control may be inaccurate, due to sensitivity to parasitic and process variations. Also, there may be a limited tuning range if phase rotation is performed at RF. Finally, performing phase rotation at RF may cause increased power consumption (e.g., due to losses in a polyphase filter that may be used to implement the phase rotation).

Another alternative to the methods and apparatus of the present disclosure involves performing phase rotation by duplicating the entire signal path. However, this may increase the die area that is required, and it may require four extra pins at the input. In addition, duplicating the entire signal path may cause increased power consumption.

Another alternative to the methods and apparatus of the present disclosure involves performing phase rotation at the local oscillator. However, this approach may cause high power consumption. In addition, the phase control may be inaccurate, due to sensitivity to parasitic and process variations. Finally, there may be at least a moderate increase in the die area that is required.

Some or all of the disadvantages associated with these known approaches may be avoided or at least minimized by performing phase rotation at baseband frequency, as described in the present disclosure. For example, if phase rotation is performed at baseband frequency, then the RF performance may not be affected. In addition, the phase generation may be more accurate than with other known approaches, as it may be independent of parasitic and process variations. In addition, the frequency tuning limitations associated with some known approaches may be avoided. Finally, in some implementations, no additional input pins are required at the input if phase rotation is performed at a baseband frequency.

Figure 10:
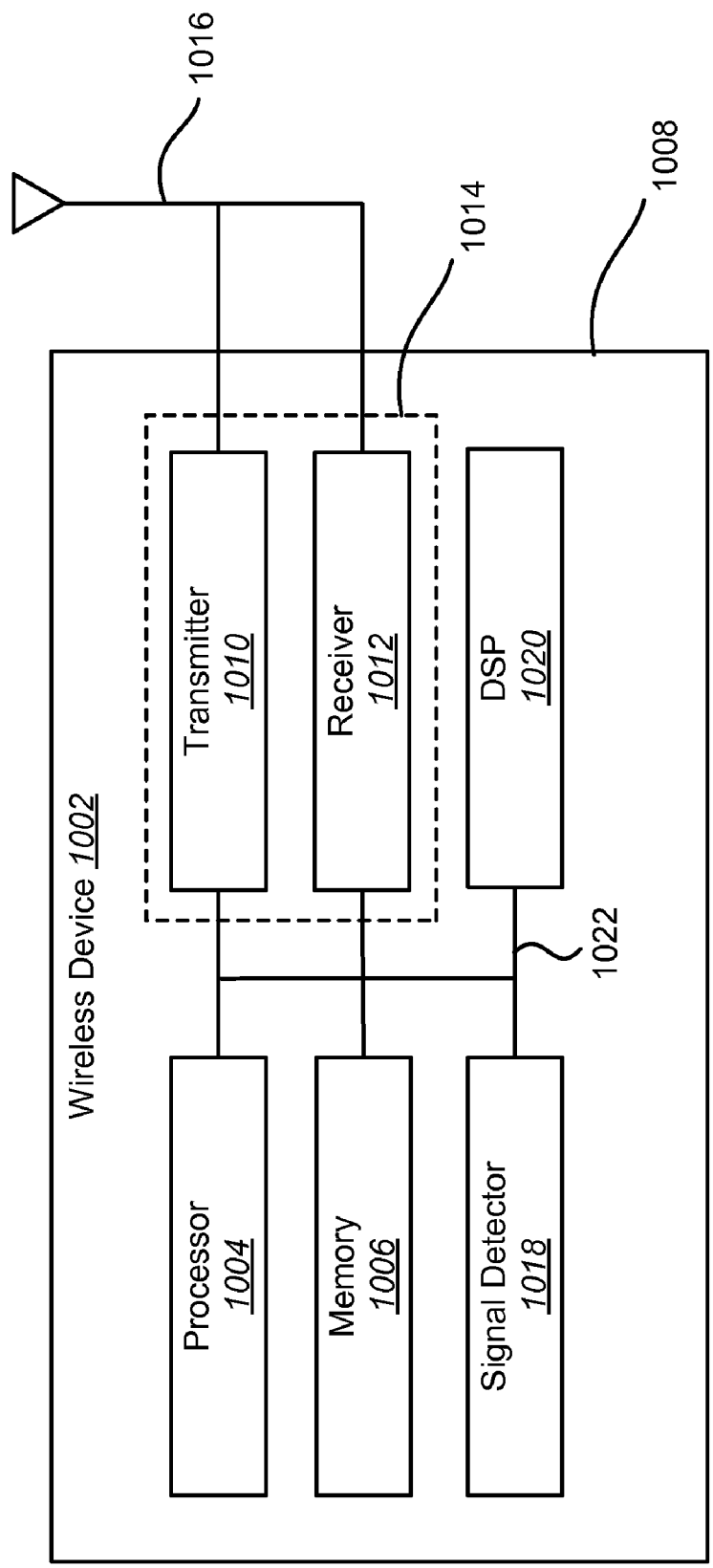
FIG. 10 illustrates various components that may be utilized in a wireless device.

FIG. 10 illustrates various components that may be utilized in a wireless device 1002. The wireless device 1002 is an example of an apparatus that may be configured to implement the various methods described herein. The wireless device 1002 may be a base station or a mobile station.

The wireless device 1002 may include a processor 1004 which controls operation of the wireless device 1002. The processor 1004 may also be referred to as a central processing unit (CPU). Memory 1006, which may include both read-only memory (ROM) and random access memory (RAM), provides instructions and data to the processor 1004. A portion of the memory 1006 may also include non-volatile random access memory (NVRAM). The processor 1004 typically performs logical and arithmetic operations based on program instructions stored within the memory 1006. The instructions in the memory 1006 may be executable to implement the methods described herein.

The wireless device 1002 may also include a housing 1008 that may include a transmitter 1010 and a receiver 1012 to allow transmission and reception of data between the wireless device 1002 and a remote location. The transmitter 1010 and receiver 1012 may be combined into a transceiver 1014. An antenna 1016 may be attached to the housing 1008 and electrically coupled to the transceiver 1014. The wireless device 1002 may also include (not shown) multiple transmitters, multiple receivers, multiple transceivers and/or multiple antenna.

The wireless device 1002 may also include a signal detector 1018 that may be used to detect and quantify the level of signals received by the transceiver 1014. The signal detector 1018 may detect such signals as total energy, pilot energy per pseudonoise (PN) chips, power spectral density, and other signals. The wireless device 1002 may also include a digital signal processor (DSP) 1020 for use in processing signals.

The various components of the wireless device 1002 may be coupled together by a bus system 1022 which may include a power bus, a control signal bus, and a status signal bus in addition to a data bus. However, for the sake of clarity, the various buses are illustrated in FIG. 10 as the bus system 1022.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIG. 7, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus for implementing phase rotation at baseband frequency for transmit diversity, comprising:
   a primary transmit signal path that receives a primary transmit signal;
   a diversity transmit signal path that also receives the primary transmit signal; and
   a signal selector within the diversity transmit signal path, wherein the signal selector performs phase rotation with respect to the primary transmit signal while the primary transmit signal is at a baseband frequency, thereby producing a diversity transmit signal.

2. The apparatus of claim 1, wherein the signal selector comprises an input that receives a phase selection control signal that specifies an angle for the phase rotation.

3. The apparatus of claim 2, wherein the signal selector receives at least one in-phase component of the primary transmit signal and receives at least one out-of-phase component of the primary transmit signal and outputs the diversity transmit signal by rearranging a combination of the at least one in-phase component and the at least one out-of-phase component based on the phase selection control signal.

4. The apparatus of claim 1, wherein the phase of the primary transmit signal is rotated by an angle that is selected from the group consisting of 0°, 90°, 180°, and 270°.

5. The apparatus of claim 1, wherein the signal selector comprises a crosspoint switch that connects inputs of the signal selector to outputs of the signal selector based on a phase selection control signal.

6. The apparatus of claim 1, wherein the phase of the primary transmit signal is rotated by 90° to obtain the diversity transmit signal, and wherein to implement the 90° phase rotation the signal selector:
   connects an I input to a $\overline{Q}$ output;
   connects a Q input to an I output;
   connects an $\overline{I}$ input to a Q output; and
   connects a $\overline{Q}$ input to an $\overline{I}$ output.

7. The apparatus of claim 1, wherein the phase of the primary transmit signal is rotated by 180° to obtain the diversity transmit signal, and wherein to implement the 180° phase rotation the signal selector:
   connects an I input to an $\overline{I}$ output;
   connects a Q input to a $\overline{Q}$ output;
   connects an $\overline{I}$ input to an I output; and
   connects a $\overline{Q}$ input to a Q output.

8. The apparatus of claim 1, wherein the phase of the primary transmit signal is rotated by 270° to obtain the diversity transmit signal, and wherein to implement the 270° phase rotation the signal selector:
connects an I input to a Q output;
connects a Q input to an $\bar{I}$ output;
connects an $\bar{I}$ input to a $\bar{Q}$ output; and
connects a $\bar{Q}$ input to an I output.

9. The apparatus of claim 1, further comprising low-pass filters that perform low-pass filtering with respect to the primary transmit signal.

10. The apparatus of claim 1, further comprising multipliers in the diversity transmit signal path that upconvert the diversity transmit signal to a radio frequency after phase rotation has been performed.

11. The apparatus of claim 1, wherein the primary transmit signal path is coupled to the diversity transmit signal path, and wherein the primary transmit signal path and the diversity transmit signal path receive the primary transmit signal.

12. The apparatus of claim 11, wherein at least one mixer in the primary transmit signal path receives the primary transmit signal, wherein the at least one mixer in the primary transmit signal path upconverts the primary transmit signal to a radio frequency.

13. The apparatus of claim 11, wherein the signal selector in the diversity transmit signal path receives the primary transmit signal.

14. The apparatus of claim 13, wherein the signal selector is coupled to at least one mixer in the diversity transmit signal path, wherein the at least one mixer in the diversity transmit signal path upconverts the diversity transmit signal to a radio frequency.

15. A method for implementing phase rotation at baseband frequency for transmit diversity, comprising:
providing a primary transmit signal to a primary transmit signal path;
providing the primary transmit signal to a diversity transmit signal path; and
performing phase rotation with respect to the primary transmit signal while the primary transmit signal is at a baseband frequency, thereby obtaining a diversity transmit signal.

16. The method of claim 15, further comprising receiving a phase selection control signal that specifies an angle for the phase rotation.

17. The method of claim 15, wherein the phase of the primary transmit signal is rotated by an angle that is selected from the group consisting of 0°, 90°, 180°, and 270°.

18. The method of claim 15, further comprising connecting inputs of a signal selector to outputs of the signal selector based on a phase selection control signal.

19. The method of claim 15, wherein the phase of the primary transmit signal is rotated by 90° to obtain the diversity transmit signal, and wherein implementing the 90° phase rotation comprises:
connecting an I input to a $\bar{Q}$ output;
connecting a Q input to an I output;
connecting an $\bar{I}$ input to a Q output; and
connecting a $\bar{Q}$ input to an $\bar{I}$ output.

20. The method of claim 15, wherein the phase of the primary transmit signal is rotated by 180° to obtain the diversity transmit signal, and wherein implementing the 180° phase rotation comprises:
connecting an I input to an $\bar{I}$ output;
connecting a Q input to a $\bar{Q}$ output;
connecting an $\bar{I}$ input to an I output; and
connecting a $\bar{Q}$ input to a Q output.

21. The method of claim 15, wherein the phase of the primary transmit signal is rotated by 270° to obtain the diversity transmit signal, and wherein implementing the 270° phase rotation comprises:
connecting an I input to a Q output;
connecting a Q input to an $\bar{I}$ output;
connecting an $\bar{I}$ input to a $\bar{Q}$ output; and
connecting a $\bar{Q}$ input to an I output.

22. The method of claim 15, further comprising performing low-pass filtering with respect to the primary transmit signal.

23. The method of claim 15, further comprising upconverting the diversity transmit signal to a radio frequency after phase rotation has been performed.

24. An apparatus for implementing phase rotation at baseband frequency for transmit diversity, comprising:
a primary transmit signal path that receives a primary transmit signal;
a diversity transmit signal path that also receives the primary transmit signal; and
means for performing phase rotation with respect to the primary transmit signal while the primary transmit signal is at a baseband frequency, thereby obtaining a diversity transmit signal.

25. The apparatus of claim 24, further comprising means for receiving a phase selection control signal that specifies an angle for the phase rotation.

26. The apparatus of claim 24, wherein the phase of the primary transmit signal is rotated by an angle that is selected from the group consisting of 90°, 180°, and 270°.

27. The apparatus of claim 24, further comprising means for connecting inputs of a signal selector to outputs of the signal selector based on a phase selection control signal.

28. The apparatus of claim 24, wherein the phase of the primary transmit signal is rotated by 90° to obtain the diversity transmit signal, and wherein implementing the 90° phase rotation comprises:
connecting an I input to a $\bar{Q}$ output;
connecting a Q input to an I output;
connecting an $\bar{I}$ input to a Q output; and
connecting a $\bar{Q}$ input to an $\bar{I}$ output.

29. The apparatus of claim 24, wherein the phase of the primary transmit signal is rotated by 180° to obtain the diversity transmit signal, and wherein implementing the 180° phase rotation comprises:
connecting an I input to an $\bar{I}$ output;
connecting a Q input to a $\bar{Q}$ output;
connecting an $\bar{I}$ input to an I output; and
connecting a $\bar{Q}$ input to a Q output.

30. The apparatus of claim 24, wherein the phase of the primary transmit signal is rotated by 270° to obtain the diversity transmit signal, and wherein implementing the 270° phase rotation comprises:
connecting an I input to a Q output;
connecting a Q input to an $\bar{I}$ output;
connecting an $\bar{I}$ input to a $\bar{Q}$ output; and
connecting a $\bar{Q}$ input to an I output.

31. The apparatus of claim 24, further comprising means for performing low-pass filtering with respect to the primary transmit signal.

32. The apparatus of claim 24, further comprising means for upconverting the diversity transmit signal to a radio frequency after phase rotation has been performed.

33. A computer-program product for implementing phase rotation at baseband frequency for transmit diversity, the computer-program product comprising a computer readable medium having instructions thereon, the instructions comprising:

code for providing a primary transmit signal to a primary transmit signal path;

code for providing the primary transmit signal to a diversity transmit signal path; and code for performing phase rotation with respect to the primary transmit signal while the primary transmit signal is at a baseband frequency, thereby obtaining a diversity transmit signal.

34. The computer-program product of claim 33, further comprising code for receiving a phase selection control signal that specifies an angle for the phase rotation.

35. The computer-program product of claim 33, wherein the phase of the primary transmit signal is rotated by an angle that is selected from the group consisting of 90°, 180°, and 270°.

36. The computer-program product of claim 33, further comprising code for connecting inputs of a signal selector to outputs of the signal selector based on a phase selection control signal.

37. The computer-program product of claim 33, wherein the phase of the primary transmit signal is rotated by 90° to obtain the diversity transmit signal, and wherein implementing the 90° phase rotation comprises:
connecting an I input to a $\overline{Q}$ output;
connecting a Q input to an I output;
connecting an $\overline{I}$ input to a Q output; and
connecting a $\overline{Q}$ input to an $\overline{I}$ output.

38. The computer-program product of claim 33, wherein the phase of the primary transmit signal is rotated by 180° to obtain the diversity transmit signal, and wherein implementing the 180° phase rotation comprises:
connecting an I input to an $\overline{I}$ output;
connecting a Q input to a $\overline{Q}$ output;
connecting an $\overline{I}$ input to an I output; and
connecting a $\overline{Q}$ input to a Q output.

39. The computer-program product of claim 33, wherein the phase of the primary transmit signal is rotated by 270° to obtain the diversity transmit signal, and wherein implementing the 270° phase rotation comprises:
connecting an I input to a Q output;
connecting a Q input to an $\overline{I}$ output;
connecting an $\overline{I}$ input to a $\overline{Q}$ output; and
connecting a $\overline{Q}$ input to an I output.

40. The computer-program product of claim 33, further comprising code for performing low-pass filtering with respect to the primary transmit signal.

41. The computer-program product of claim 33, further comprising code for upconverting the diversity transmit signal to a radio frequency after phase rotation has been performed.

* * * * *